UNITED STATES PATENT OFFICE.

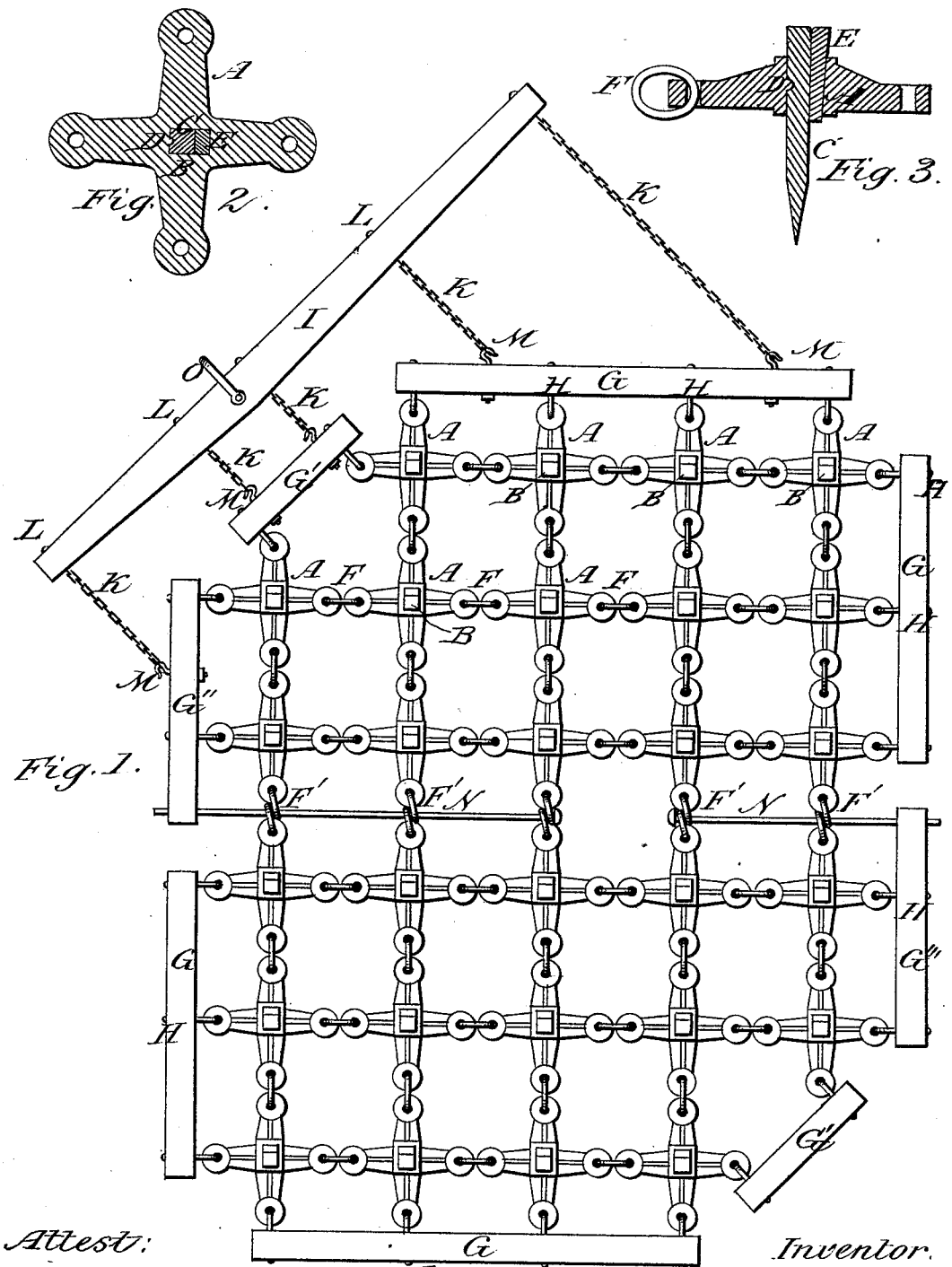

LUZON C. ENGLISH, OF CATON, NEW YORK.

IMPROVEMENT IN HARROWS.

Specification forming part of Letters Patent No. 213,983, dated April 8, 1879; application filed September 10, 1878.

*To all whom it may concern:*

Be it known that I, LUZON C. ENGLISH, of the town of Caton, in the county of Steuben and State of New York, have invented a new and useful Improvement in Harrows, of which the following is a specification:

The invention relates to a new and improved construction of flexible harrows for agricultural purposes, whereby the same are rendered more effective, and whereby the cost of construction is materially lessened, and a more ready facility of transportation and placing and adjusting the parts secured; and the invention consists in the construction and arrangement of parts, as hereinafter described.

In the accompanying drawings, in which similar letters of reference indicate like parts, Figure 1 is a top view of the device. Fig. 2 is a cross-section, and Fig. 3 a vertical section, of one of the metallic crosses employed in its construction, any number of which may be used, suited to the required size of the implement.

The four-armed crosses A are constructed with an oblong eye, B, in the center of each for the reception of the teeth C. D represents a projection or boss on one of the shortest sides of the eye B, fitting a corresponding depression in the tooth C, for the purpose of more effectually preventing it from being moved upward or downward when in use. E represents wooden wedges, driven through the eyes B at the sides of the teeth C opposite the projections D, for the purpose of holding the teeth C firmly in their places. F F' represent links, connecting the crosses A by passing through suitable holes in the ends of the arms, and are formed by bending a piece of wire or rod so as to bring the two ends together, forming what is commonly called a "cold shut," thus facilitating and cheapening the work of connecting the crosses. G G' G'' represent wooden beams, connected with the outer arms of the metallic crosses by means of staples H passing through and fastening on the outside of the same. N represents metallic rods passing through the links F' and beams G'', thus connecting the two parts of the implement when in use, and allowing the same to be readily disconnected for the purpose of more easy transportation. I represents a wooden draw-beam, connected to the beams G G' G'' by chains K, staples L, and hooks M, and so arranged as to draw equally from each of the several points of attachment.

The staples L connect the chains K permanently to the draw-beam I, and the hooks M are fastened to the beams G G' G'', for the purpose of forming a convenient mode for attaching the chains K to the implement when in use.

The clevis O is attached to the draw-beam I at such a point that when the implement is dragged over a plowed field, from the same, it will assume such a position in reference to the line of draft that no two teeth will follow the same track, thus effectually moving the entire surface of the soil by one passage of the implement over the field, while the mode of connecting the crosses A, by means of the links F F', beams G G' G'', staples H, and rods N, secures such flexibility to the implement as to render it capable of self-adjustment to the inequalities of surface, and at the same time makes its passage over immovable obstructions easy without stopping the team, thus effecting a saving of both time and labor, and rendering the pulverization of the soil more complete.

What I claim is—

The crosses A, having eyes B and teeth C, and flexible connections F, F', and N, in combination with side beams, G G'', and corner beam, G', provided with hooks M, the chains K, and draft-bar L, all constructed, arranged, and operating as set forth.

LUZON C. ENGLISH.

Witnesses:
E. SPAULDING,
E. C. ENGLISH.